(12) United States Patent
Upadhyay et al.

(10) Patent No.: US 9,455,887 B1
(45) Date of Patent: Sep. 27, 2016

(54) DISTRIBUTED PERFORMANCE EVALUATION FRAMEWORK

(71) Applicant: Amazon Technologies, Inc., Seattle, WA (US)

(72) Inventors: Divyang Mahendrabhai Upadhyay, Bellevue, WA (US); David William Abrahams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

(21) Appl. No.: 13/966,867

(22) Filed: Aug. 14, 2013

(51) Int. Cl.
  *G06F 15/173* (2006.01)
  *H04L 12/26* (2006.01)

(52) U.S. Cl.
  CPC .................... *H04L 43/062* (2013.01)

(58) Field of Classification Search
  CPC  G06F 9/505; H04L 67/1008; H04L 67/1029
  USPC ......................................................... 709/226
  See application file for complete search history.

(56) References Cited

U.S. PATENT DOCUMENTS

| 6,279,001 | B1 * | 8/2001 | DeBettencourt et al. |
| 6,714,961 | B1 | 3/2004 | Holmberg et al. |
| 6,922,724 | B1 * | 7/2005 | Freeman et al. ............ 709/223 |
| 8,086,720 | B2 | 12/2011 | Breese et al. |
| 8,170,859 | B1 | 5/2012 | Christensson et al. |
| 8,185,619 | B1 | 5/2012 | Maiocco et al. |
| 2007/0206511 | A1 * | 9/2007 | Purpura ........................ 370/252 |
| 2008/0154837 | A1 * | 6/2008 | Morimura et al. ............. 706/48 |
| 2008/0221941 | A1 * | 9/2008 | Cherkasova et al. ............. 705/7 |
| 2010/0223385 | A1 * | 9/2010 | Gulley et al. ................. 709/226 |
| 2012/0042210 | A1 | 2/2012 | Glaser et al. |
| 2014/0095694 | A1 * | 4/2014 | Kimmet et al. .............. 709/224 |

OTHER PUBLICATIONS

U.S. Appl. No. 13/466,943, filed May 8, 2012, Chandrasekharapuram.
U.S. Appl. No. 13/466,951, filed May 8, 2012, Chandrasekharapuram.
U.S. Appl. No. 13/466,955, filed May 8, 2012, Chandrasekharapuram.
U.S. Appl. No. 13/864,905, filed Apr. 17, 2013, Arguelles.
U.S. Official Action dated May 9, 2014 in U.S. Appl. No. 13/466,943, filed May 8, 2012, first named inventor: Chandrasekharapuram.

* cited by examiner

*Primary Examiner* — Phuoc Nguyen
(74) *Attorney, Agent, or Firm* — Lee & Hayes, PLLC

(57) ABSTRACT

A distributed performance evaluation framework provides functionality for evaluating the availability, reliability, and scalability of a network-based service. The framework includes a control and reporting tier and a load-generating tier. The control and reporting tier provides a control interface through which a request to evaluate the performance of a service may be received. In response to receiving such a request, the control and reporting tier creates a load-generating job for use by the load-generating tier. Load-generating instances in the load-generating tier are configured to perform the load-generating job by executing instances of a load-generating plug-in configured to generate requests to the service. The load-generating instances also periodically provide data regarding the status of each load-generating job to the control and reporting tier.

20 Claims, 11 Drawing Sheets

DISTRIBUTED PERFORMANCE EVALUATION FRAMEWORK

BACKGROUND

Prior to the deployment of a network-based service, it is important for the developer of such a service to have a high level of confidence that the service can withstand the network traffic likely to be received by the service when placed into production. For a variety of reasons, however, it can be complex and expensive to simulate the network traffic likely to be received by a production network-based service. This is especially true for large-scale network-based services that are architected to handle extremely high volumes of requests. Moreover, systems might not scale according to predictive models when under the load of actual requests. As a result, it may be difficult for a developer to test the availability, reliability, and scalability of a network-based service prior to deployment.

The disclosure made herein is presented with respect to these and other considerations.

DETAILED DESCRIPTION

Figure 1:
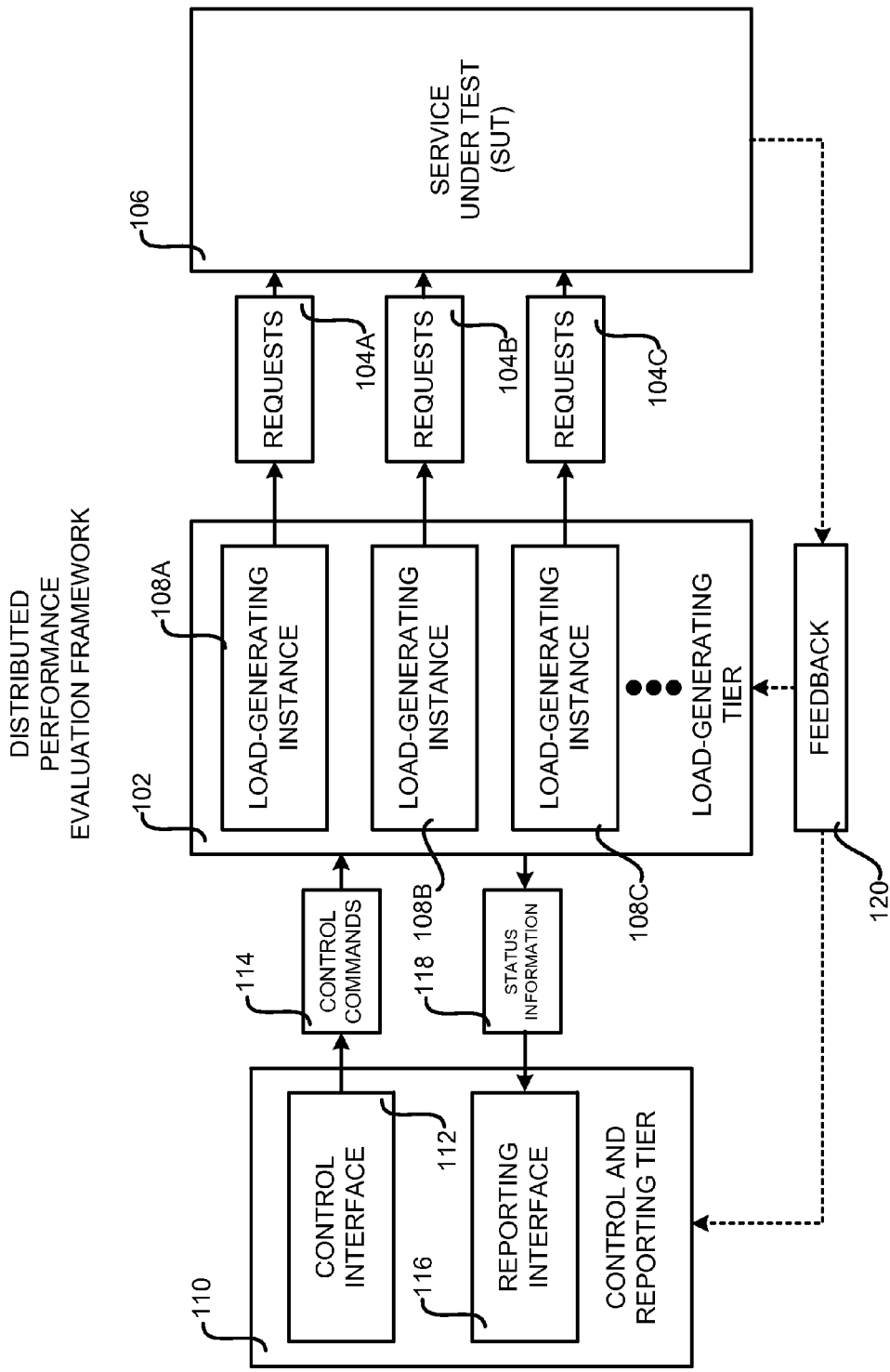
FIG. 1 is a software architecture diagram that illustrates aspects of the configuration and operation of a distributed performance evaluation framework, according to one embodiment disclosed herein.

The following detailed description is directed to concepts and technologies for providing a distributed performance evaluation framework. Utilizing an implementation of the technologies described herein, a developer can quickly and easily evaluate the availability, reliability, and scalability of a network-based service. Additionally, by utilizing infrastructure on-demand to perform the performance evaluation process disclosed herein, even large-scale network-based services can be stress tested at a cost that is likely to be lower than previous solutions. Moreover, such testing can be performed regardless of the protocol, or protocols, utilized by the network-based service. The testing processes described herein might be utilized to provision computing resources in advance of the deployment to an actual production workload.

According to one particular embodiment, the distributed performance evaluation framework (which may be referred to herein as "the framework") includes a control and reporting tier and a separate load-generating tier. As will be described in greater detail below, the control and reporting tier and the load-generating tier may be implemented in a distributed fashion such that the operation of each tier is scalable, and such that the failure of components in one tier will not cause components in the other tier to also fail. The control and reporting tier and the load-generating tier may be executed on the same or different hardware or virtual machine instances.

In one implementation, one or more hardware computing systems or virtual machine instances are utilized to implement the control and reporting tier. The control and reporting tier provides a control interface, such as a user interface ("UI") or an application programming interface ("API") such as a Web service API, through which a request to evaluate the performance of a service (which may be referred to herein as the "service under test" or "SUT") may be received. The request is expressed independently of the computing systems (i.e. the load-generating tier) that are utilized to generate a load for evaluating the performance of the service. In this way, the requestor does not need to be concerned about the configuration and/or operation of the underlying computing systems that are utilized to test the service.

In one implementation, a request includes a load-generating plug-in, or data identifying the location of such a plug-in. The request might also include load-generating data, or data identifying the location of the load-generating data. The request might also identify a desired number of requests per time period (e.g. requests per second) that should be submitted to the SUT, as well as data describing the condition, or conditions, under which the testing should be stopped (e.g. a specified time period has elapsed or a specified number of requests have been submitted to the SUT). As will be described in greater detail below, the load-generating plug-in is configured to communicate with the SUT using a protocol supported by the SUT. The load-generating plug-in is also configured to use the load-generating data to generate requests to the SUT in some embodiments. It should be appreciated that, in other embodiments, the load-generating plug-in may be configured to generate requests to the SUT without the use of load-generating data.

In response to receiving a request to evaluate the performance of a SUT, such as the request described above, the control and reporting tier is configured to create a load-generating job for use by the load-generating tier. In particular, a load-generating job may be created that identifies the load-generating plug-in, the load-generating data, the desired number of requests per time period, and the condition, or conditions, under which the test should be discontinued. The load-generating job may then be placed on a job queue for consumption by one or more load-generating instances. Mechanisms other than a queue might also be utilized to provide load-generating jobs to components in the load-generating tier.

Load-generating instances in the load-generating tier are configured to execute instances of the load-generating plug-in to generate requests to the SUT. The load-generating instances may be implemented as hardware devices or might be implemented as virtual machine instances. When implemented as virtual machine instances, the load-generating instances might be provided by a service provider operated network-based distributed computing environment (which may be referred to herein as a "service provider network"). Using facilities provided by such a service provider network, virtual machine instances can be provisioned and utilized as-needed to generate requests to the SUT. The virtual machine instances may then be de-provisioned once testing has been completed. By using computing resources for testing the SUT on an as-needed basis, the cost of evaluating the performance of a network-based service can be minimized. Additional details regarding the use of computing resources provided by a service provider network to evaluate the performance of a network-based service will be provided below.

The load-generating instances operating in the load-generating tier might also be configured to periodically examine the job queue to determine if a load-generating job is available. If a load-generating job is available, a load-generating instance with available processing capacity will dequeue the load-generating job from the job queue. The load-generating instance will then execute instances of the load-generating plug-in to generate requests to the SUT. As discussed briefly above, the load-generating plug-in utilizes the load-generating data to generate the requests to the SUT. The load-generating instance also determines if it is supplying the desired number of requests per time period specified by the load-generating job to the SUT. If the load-generating instance is supplying the desired number of requests per time period specified by the load-generating job to the SUT, the load-generating instance will continue executing the instances of the load-generating plug-ins to generate requests to the SUT until the specified condition, or conditions, for the load-generating job to be stopped have been reached.

For various reasons, a single load-generating instance may be unable to supply the desired number of requests per time period specified by the load-generating job to the SUT. For example, and without limitation, a single load-generating instance may be unable to supply the desired number of requests per time period due to limited computational power, memory, or network bandwidth.

If a load-generating instance is not supplying the desired number of requests per time period specified by the load-generating job to the SUT, the load-generating instance will enable other load-generating instances to also submit requests to the SUT. For example, in one embodiment, a load-generating instance may place a load-generating job on the job queue for the unmet portion of the desired number of requests. Another load-generating instance may then retrieve the load-generating job from the job queue and begin submitting requests to the same SUT using the load-generating plug-in in the manner described above. Load-generating instances may be added in this manner until the desired number of requests per time period are being submitted to the SUT. Once the specified condition, or conditions, for stopping the evaluation of the SUT has been reached, execution of the instances of the load-generating plug-in are stopped.

It should be appreciated that, when a load-generating instance places a job on the job queue for the unmet portion of a desired number of requests as described above, it also reduces its own target number of requests per time period by the same amount. This prevents a situation where a resource bottleneck is removed on the original load-generating instance and the combined load-generating resources generate more requests per time period than intended as a result. For example, one load-generating instance may be only able to generate six requests per second out of a requested ten due to a bad network connection or other problem. The load-generating instance therefore reduces its target to six requests per second, and places a job on the job queue asking another load-generating instance to generate four requests per second. In this example, the bad network connection may be repaired later, but the first load-generating instance correctly continues to generate only six requests per second, keeping to a total of ten requests per second.

In some embodiments, the load-generating instances are also configured to periodically provide data regarding the status of each load-generating job to the control and reporting tier. For example, in one embodiment the load-generating instances write job status information to a database table (referred to herein as the "job status table") indicating that a job is processing, running, is stopping, has been stopped, is deleting, or is complete. The control and reporting tier might provide an interface, such as a UI or an API, through which the job status information may be retrieved. Mechanisms other than a database table may be utilized to communicate information regarding the status of load-generating jobs from the load-generating tier to the control and reporting tier. Additional details regarding the various components and processes described above for providing a distributed performance evaluation framework will be presented below with regard to FIGS. 1-10.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a software architecture diagram that illustrates aspects of the configuration and operation of a distributed performance evaluation framework, according to one embodiment disclosed herein. As described briefly above, the framework includes a load-generating tier 102 and a separate control and reporting tier 110 in one embodiment. In other implementations, a single tier or more than two tiers might be utilized to provide the functionality described herein as being provided by the load-generating tier 102 and/or the control and reporting tier 110. As also described briefly above, one or more hardware computing systems or virtual machine instances may be utilized to implement the control and reporting tier 110 and/or the load-generating tier 102.

The control and reporting tier 110 may be configured to provide a control interface 112, such as a UI or an API such as a Web service API (which may be referred to herein as a "load generating Web service API"), through which a request (not shown in FIG. 1) to evaluate the performance of a SUT 106 may be received. In response to receiving such a request, the control interface 112 is configured to transmit a control command 114 to the load-generating tier 102 instructing the load-generating tier 102 to perform the requested evaluation of the SUT 106. In one embodiment, for instance, the control interface 112 creates a load-generating job (not shown in FIG. 1) for use by the load-generating tier 102.

As mentioned above, the load-generating tier 102 includes one or more load-generating instances 108A-108C (which might be referred to herein singularly as "as load generating instance 108" or collectively as "the load generating instances 108"). As discussed briefly above, the load-generating instances 108 may be implemented as hardware devices or might be implemented as virtual machine instances. When implemented as virtual machine instances, the load-generating instances 108 might be provided by a service provider network (not shown in FIG. 1). In this way, the load-generating instances 108 can be created and utilized as needed to generate requests to the SUT. The load-generating instances 108 may then be de-provisioned once testing has been completed.

The load-generating instances 108 receive load-generating jobs from the control interface 112 and utilize the load generating jobs to generate requests 104A-104C (which might be referred to herein singularly as "a request 104" or collectively as "the requests 104") to the SUT 106. The requests 104 might be requests for the SUT 106 to perform some type of processing, to provide some type of data in response to the request such as a text, image or video file, or other types of requests. As will be described in greater detail below the load-generating instances 108 may be configured to communicate with one another to ensure that a desired number of requests 104 are being provided to the SUT 106. Moreover, additional load-generating instances 108 may be added to the load-generating tier 102 until the desired number of requests per time period are being provided to the SUT 106. The load-generating instances 108 will continue submitting requests 104 to the SUT until one or more conditions specified by a load-generating job have occurred, or a request to stop testing has been received. The load-generating instances 108 will then stop submitting requests to the SUT 106 and may be de-provisioned in certain embodiments. Additional details regarding this process will be provided below.

The control interface 112 might also be configured to receive and provide other types of control commands 114 to the load-generating tier 102. For example, the control interface 112 might receive control commands 114 for modifying, stopping, or deleting load-generating jobs. Other types of control commands 114 might also be received and provided to the load-generating tier 102. In response to receiving such control commands 114, the load-generating instances 108 in the load-generating tier 102 will take appropriate action, such as modifying, stopping, or deleting a load-generating job.

As also mentioned briefly above, the load-generating instances 108 in the load-generating tier 102 might also be configured to periodically provide status information 118 regarding the status of each load-generating job to the control and reporting tier 110. For example, the load-generating instances 108 might be configured to provide status information 118 to the control and reporting tier 110 indicating that a job is processing, running, is stopping, has been stopped, is deleting, or is complete. The control interface 116 in the control and reporting tier 110 might also provide a reporting interface 116, such as a UI or an API, through which the job status information 118 may be retrieved.

As shown in FIG. 1, the SUT 106 is configured in some embodiments to provide feedback 120 to the load-generating tier 102 and/or the control and reporting tier 110. For instance, the SUT 106 might provide feedback 120 to the load-generating tier 102 and/or the control and reporting tier 110 indicating the state of its performance. As a specific example, the SUT 106 might provide feedback 120 indicating that it has exceeded a certain performance threshold (e.g. percentage of memory or central processing unit ("CPU") utilization). Various actions might then be performed in response to receiving the feedback 120. For example, the submission of requests 104 to the SUT 106 might be stopped. Alternately, the volume of requests being submitted to the SUT 106 might be modified based upon the provided feedback 120. Other actions might also be taken based upon the feedback 120 provided by the SUT 106. In some implementations the feedback 120 might also indicate that the SUT 106 has scaled its capacity in response to the demand placed upon it by the load-generating tier 102. The load-generating tier 102 and/or the control and reporting tier 110 might take various actions based upon receiving this type of feedback from the SUT 106.

Additional details regarding the configuration and operation of the control and reporting tier 110 will be provided below with regard to FIGS. 2 and 5. Additional details regarding the configuration and operation of the load-generating tier 102 will be provided below with regard to FIG. 3. Additional details regarding the configuration and operation of the load-generating instances 108 will be provided below with regard to FIGS. 4, 6A, and 6B. Additional details regarding a service provider network that may be utilized to implement components in the control and reporting tier 110, components in the load-generating tier 102, and/or the SUT 106 will be described in greater detail below with regard to FIGS. 8 and 9.

Figure 2:
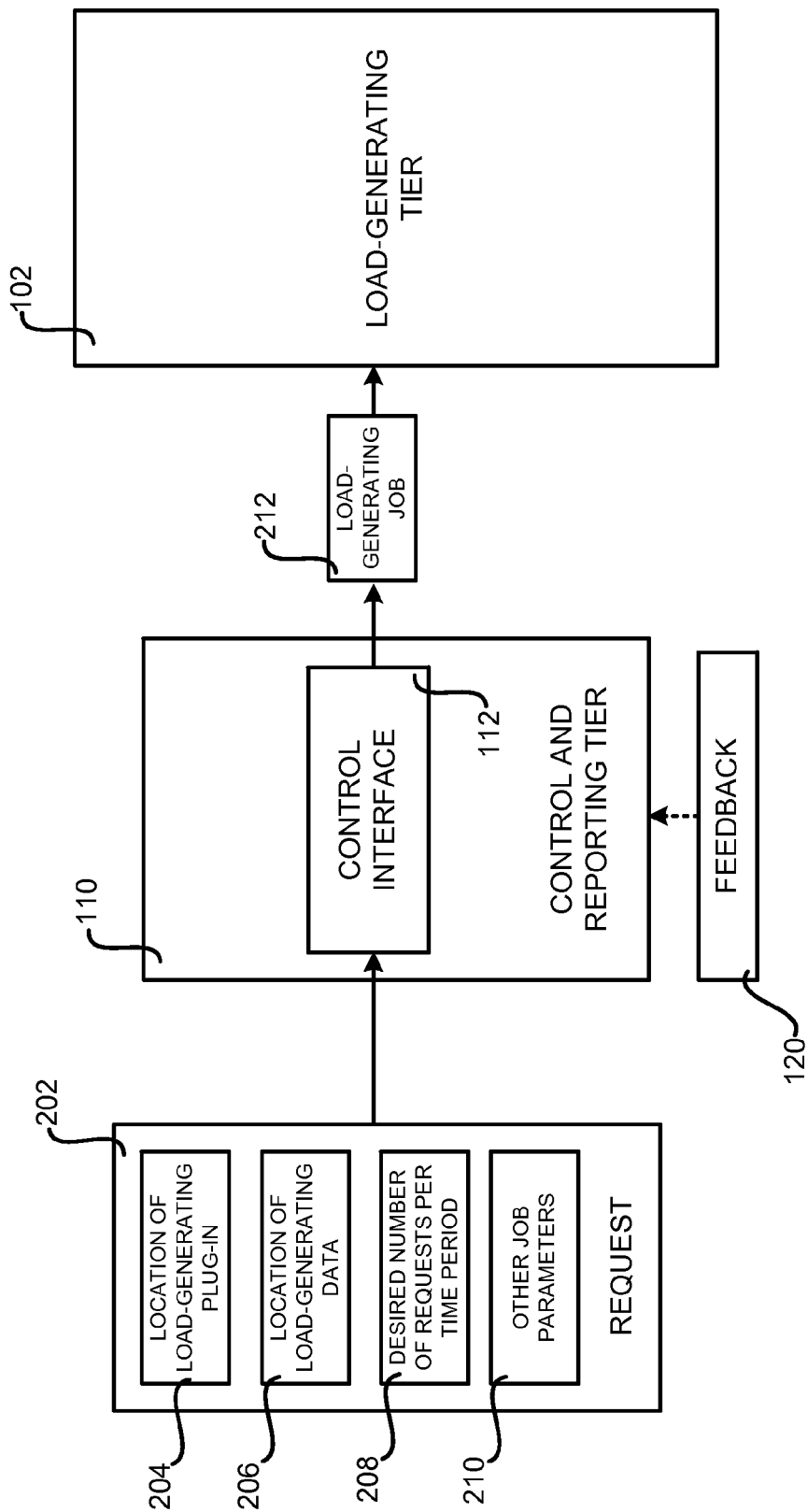
FIG. 2 is a software architecture diagram that illustrates additional aspects of the configuration and operation of a control and reporting tier that is a part of a distributed performance evaluation framework in one embodiment disclosed herein.

FIG. 2 is a software architecture diagram that illustrates additional aspects of the configuration and operation of the control and reporting tier 110, according to one embodiment disclosed herein. As shown in FIG. 2 and described briefly above, the control interface 112 is configured in one embodiment to provide an interface, such as a UI or an API, for receiving a request 202 to evaluate the performance of a SUT 106. In the embodiment shown in FIG. 2, the request 202 includes data 204 identifying a network location of the location of a load-generating plug-in. Alternately, the request 202 might include the actual load-generating plug-in. The request 202 might also include load-generating data, or data 206 identifying the location of the load-generating data. As will be described in greater detail below, the load-generating instances 108 may retrieve the load-generating plug-in and the load-generating data from the specified locations. The load-generating plug-in is then executed on the load-generating instances 108 to generate the requests 104 the SUT 106.

In some implementations, the request 202 also specifies a desired number of requests per time period 208 (e.g. requests per second or other time period) that the load-generating instances 108 are to submit to the SUT 106. The request 202 might also specify a condition, or conditions, under which the testing should be stopped. For example, the request 202 might specify that the requests 104 should be submitted to the SUT 106 for a specified period of time or until a certain number of requests have been submitted to the SUT 106. The request 202 might also include other job parameters 210 in other embodiments. For example, and without limitation, the other job parameters 210 might specify a desired amount of stress or resource usage that should be applied to the SUT 106. In this example, the control and reporting tier 110 might monitor feedback 120 from the SUT 106 indicating the current resource utilization and/or stress level of the SUT 106. The control and reporting tire 110 might discontinue testing when the desired stress level or resource utilization level has been reached.

In some implementations, the request 202 specifies a rate of change for the requests 104. For example, the request 202 might specify that the requests 104 be gradually ramped up from zero requests 104 per minute to one thousand requests 104 per minute over the course of an hour. The request 202 might further specify that the number of requests 104 then stay constant for some period of time. The request 202 might then specify that the number of requests 104 being submitted to the SUT 106 be ramped back down to zero over the course of some other time period. In this way, a distribution might be specified for the number of requests 104 to be submitted to the SUT 106 over the course of a period of time. In this regard, it should be appreciated that the volume of requests 104 to be delivered to the SUT 106 might also be specified in other ways in other embodiments.

In response to receiving a request 202 to evaluate the performance of the SUT 106, a component in the control and reporting tier 110, such as the control interface 112, is configured to create a load-generating job 212 for use by the load-generating tier 102. The load-generating job 212 may identify the location of the load-generating plug-in, the location of the load-generating data, the desired number of requests per time period 208, and the condition, or conditions, under which the load-generating job should be discontinued. The load-generating job 212 might also include one or more other job parameters 210.

A component within the control and reporting tier 110, such as the control interface 112, may then place the load-generating job 212 on a job queue (not shown in FIG. 2) in the load-generating tier 102 for consumption by one or more of the load-generating instances 108. Mechanisms other than a queue might also be utilized to provide load-generating jobs 212 to components in the load-generating tier 102. Additional details regarding this process will be provided below with regard to FIG. 3.

Figure 3:
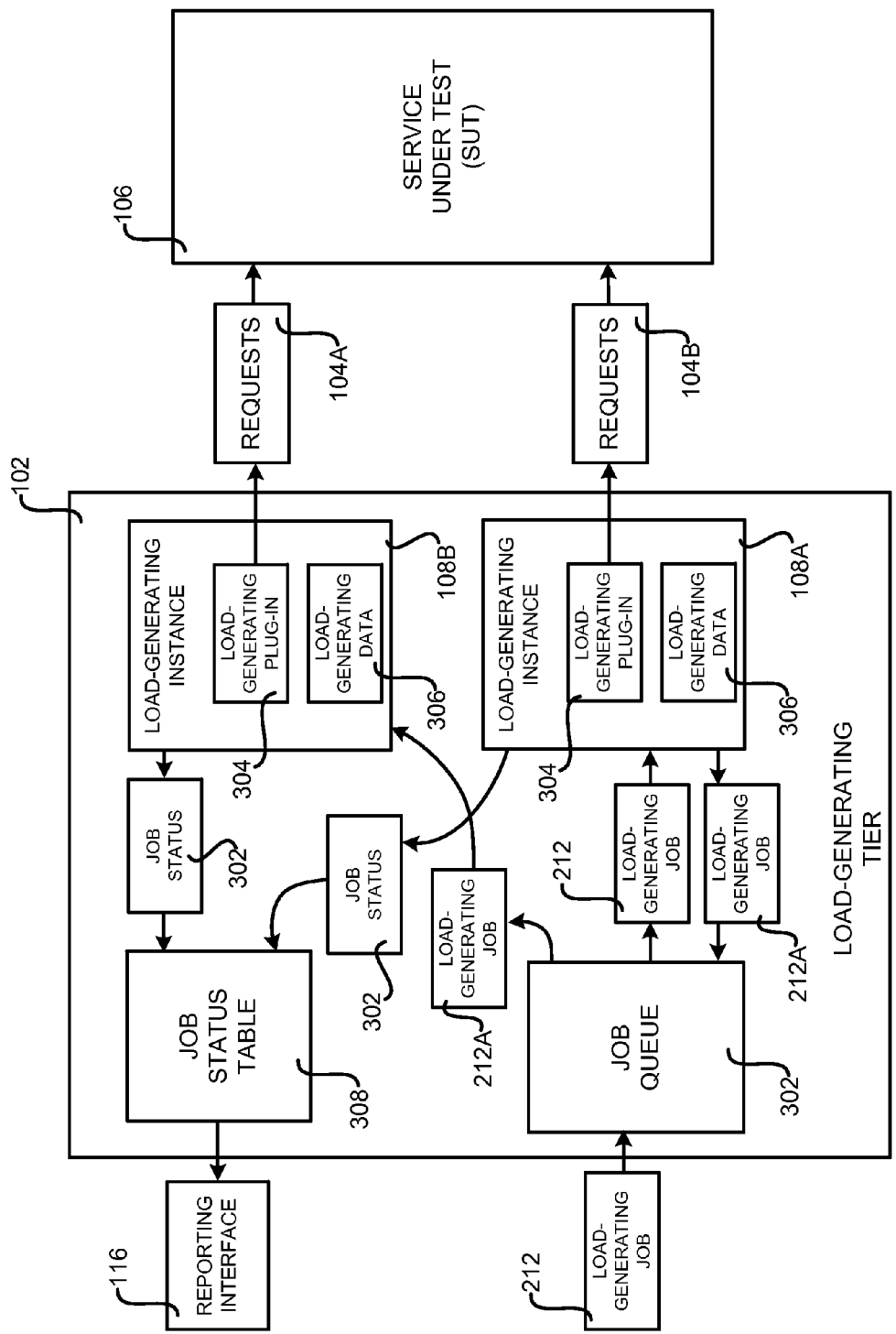
FIG. 3 is a software architecture diagram that illustrates additional aspects of the configuration and operation of a load-generating tier that is a part of a distributed performance evaluation framework in one embodiment disclosed herein.

FIG. 3 is a software architecture diagram that illustrates additional aspects of the configuration and operation of the load-generating tier 102, according to one embodiment disclosed herein. As shown in FIG. 3 and described briefly above, a component in the control and reporting tier 110 is configured to place load-generating jobs 212 on a job queue 302 in the load-generating tier 102. The job queue 302 is a distributed queue provided by a service provider network in one implementation. The job queue 302 might also be provided by other computing systems in other embodiments. Additionally, mechanisms other than a queue might also be utilized to enable communication between load-generating instances 108 in other implementations.

The load-generating instances 108 operating in the load-generating tier 102 are also configured to periodically examine the job queue 302 to determine if a load-generating job 212 is available on the queue 302. If a load-generating job 212 is on the job queue 302, an existing load-generating instance 108 with available processing capacity will dequeue the load-generating job 212 from the job queue 302. The load-generating instance 212 will then execute instances of the load-generating plug-in 304 identified by the dequeued load-generating job 212 to generate requests to the SUT 106. Each load-generating instance 108 might include framework components for hosting and executing the load-generating plug-in 304.

In the example shown in FIG. 3, for instance, the load-generating instance 108A has dequeued the load-generating job 212 from the job queue 302. The load-generating instance 108A then executes instances of the load-generating plug-in 304 specified by the load-generating job 212 to generate the requests 104B to the SUT 106. As mentioned above, the load-generating plug-in 304 is configured to communicate with the SUT 106 using a protocol supported by the SUT 106. The load-generating plug-in 304 generates the requests 104 using the load-generating data 306 specified in the load-generating job 212.

As discussed briefly above, the load-generating instances 108 may be implemented as hardware devices or might be implemented as virtual machine instances. When implemented as virtual machine instances, the load-generating instances might be provided by a service provider network. Using facilities provided by a service provider network, virtual machine instances can be instantiated and utilized as-needed to generate requests to the SUT 106. The virtual machine instances may then be de-provisioned once testing has been completed. Additional details regarding a service provider network configured to provide this functionality will be provided below with regard to FIGS. 8 and 9.

Each load-generating instance 108 is also configured to determine if it is supplying the desired number of requests 104 per time period specified by the load-generating job 212 to the SUT 106. If a load-generating instance 108 is supplying the desired number of requests 104 per time period specified by a load-generating job 212 to the SUT 106, the load-generating instance 108 will continue executing the instances of the load-generating plug-in 304 to generate the requests 104 to the SUT 106 until the specified conditions for the load-generating job 212 to be stopped have been reached or until a control command 114 is received indicating that the job should be stopped.

If a load-generating instance 108 is not supplying the desired number of requests 104 per time period specified by a load-generating job 212 to the SUT 106, the load-generating instance 108 will enable other load-generating instances 108 to also submit requests 104 to the SUT 106. For example, in one embodiment, a load-generating instance 108 may place a new load-generating job 212 on the job queue 302 for the unmet portion of the desired number of requests 104. Another load-generating instance 108 may then retrieve the load-generating job 212 from the job queue 302 and begin submitting requests 104 to the same SUT 106 using the load-generating plug-in 304 in the manner described above.

In the example shown in FIG. 3, for instance, the load-generating instance 108A has determined that it is not supplying the desired number of requests 104 specified in the load-generating job 212 to the SUT 106. As a result, the load-generating instance 108A has placed a new load-generating job 212A on the job queue 302 for the unmet number of requests 104. In turn, another load-generating instance 108B has retrieved the load-generating job 212A from the job queue 302. The load-generating instance 108B then utilizes the load-generating plug-in 304 specified by the load-generating job 212A to submit requests 104A to the SUT 106. Load-generating instances 108 may be added in this manner until the desired number of requests per time period 208 are being submitted to the SUT 106. Once the specified condition, or conditions, for stopping the evaluation of the SUT 106 has been reached or a control command to stop execution has been received, execution of the instances of the load-generating plug-in 304 are stopped.

As discussed briefly above, the load-generating instances 108 might also be configured to periodically provide job status data regarding the status of each load-generating job 212 that is being executed to the control and reporting tier 110. For example, in one embodiment the load-generating instances 108 write data to a job status table 308 indicating that a load-generating job 212 is processing, running, is stopping, has been stopped, is deleting, or is complete. The control and reporting tier might provide a reporting interface 116, such as a UI or an API, through which the job status information contained in the job status table 308 may be retrieved. Mechanisms other than a database table may be utilized to communicate information regarding the status of load-generating jobs from the load-generating tier to the control and reporting tier.

Figure 4:
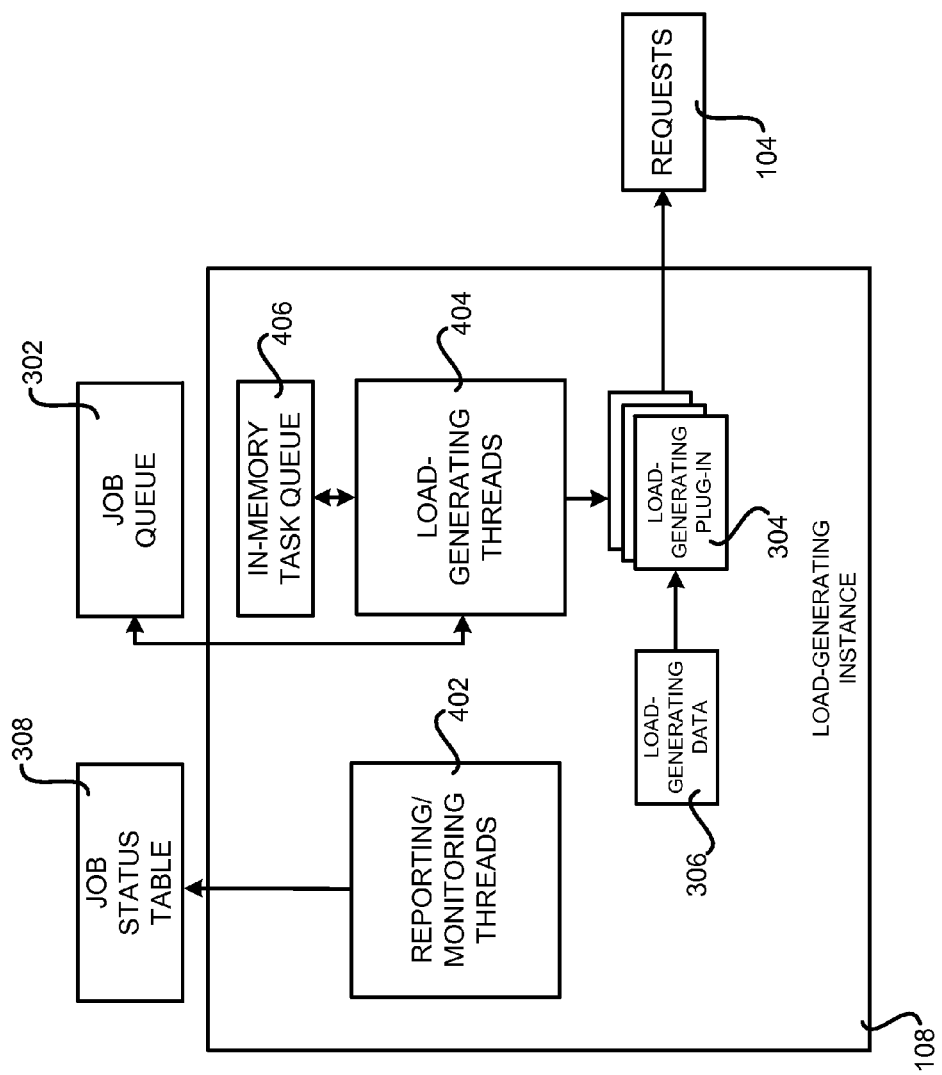
FIG. 4 is a software architecture diagram showing additional aspects regarding the configuration and operation of a load-generating instance, according to one embodiment disclosed herein.

FIG. 4 is a software architecture diagram showing additional aspects regarding the configuration and operation of a load-generating instance 108, according to one embodiment disclosed herein. As shown in FIG. 4, each load-generating instance 108 executes one or more reporting/monitoring threads 402 and one or more separate load-generating threads 404 in one implementation. The reporting/monitoring threads 402 provide functionality for reporting the status of load-processing jobs by way of the job status table 308 in the manner described above. The load-generating threads 404 are executed separately from the reporting/monitoring threads 402 and provide the functionality for generating the requests 104 to the SUT 106.

As shown in FIG. 4, each load-generating instance 108 might also maintain an in-memory job queue 406. When one of the load-generating threads 404 dequeues a load-generating job 212 from the job queue 302, a number of jobs are placed on the in-memory task queue equal to the number of desired requests per time period specified by the load-generating job 212. Instances of the load-generating plug-in 304 are then executed. The instances of the load-generating plug-in 304 then dequeue jobs from the in-memory task queue 406 and, for each job, submit a request 104 to the SUT 106. Once a request 104 has been completed, an instance of the load-generating plug-in 304 dequeues another job from the in-memory task queue 406.

In some embodiments, the load-generating job 212 specifies the maximum number of load-generating threads 404 that may be executed by a load-generating instance 108 at a time. In this embodiment, instances of the load-generating plug-in 304 may be created up to the maximum number of threads specified by the load-generating job 212 and utilized in the manner described above. It should be appreciated that the software architecture shown in FIG. 4 is merely illustrative and that each load-generating instance 108 might be configured differently in other embodiments. Additional details regarding the operation of the load-generating instances 108 will be provided below with regard to FIGS. 6A and 6B.

It should be appreciated that, in some implementations, the same load-generating instance 108 might be utilized to generate requests 104 on behalf of different users or entities. In these implementations, mechanisms might be implemented at each load-generating instance 108 to ensure that the data associated with each user is inaccessible to other users. For example, partitioning schemes, encryption mechanisms, and other technologies might be utilized to ensure that one user of a load-generating instance 108 cannot view or otherwise access the data of another user.

It should also be appreciated that the technologies described herein might also be utilized with other types of systems and technologies for introducing failures into a computing network. For example, another system might be utilized in conjunction with the technologies disclosed herein that injects network packet loss, latency, timeouts, and other types of network failures. In this way, the operation of an SUT 106 under different types of request loads and simulated network problems can be evaluated.

Figure 5:
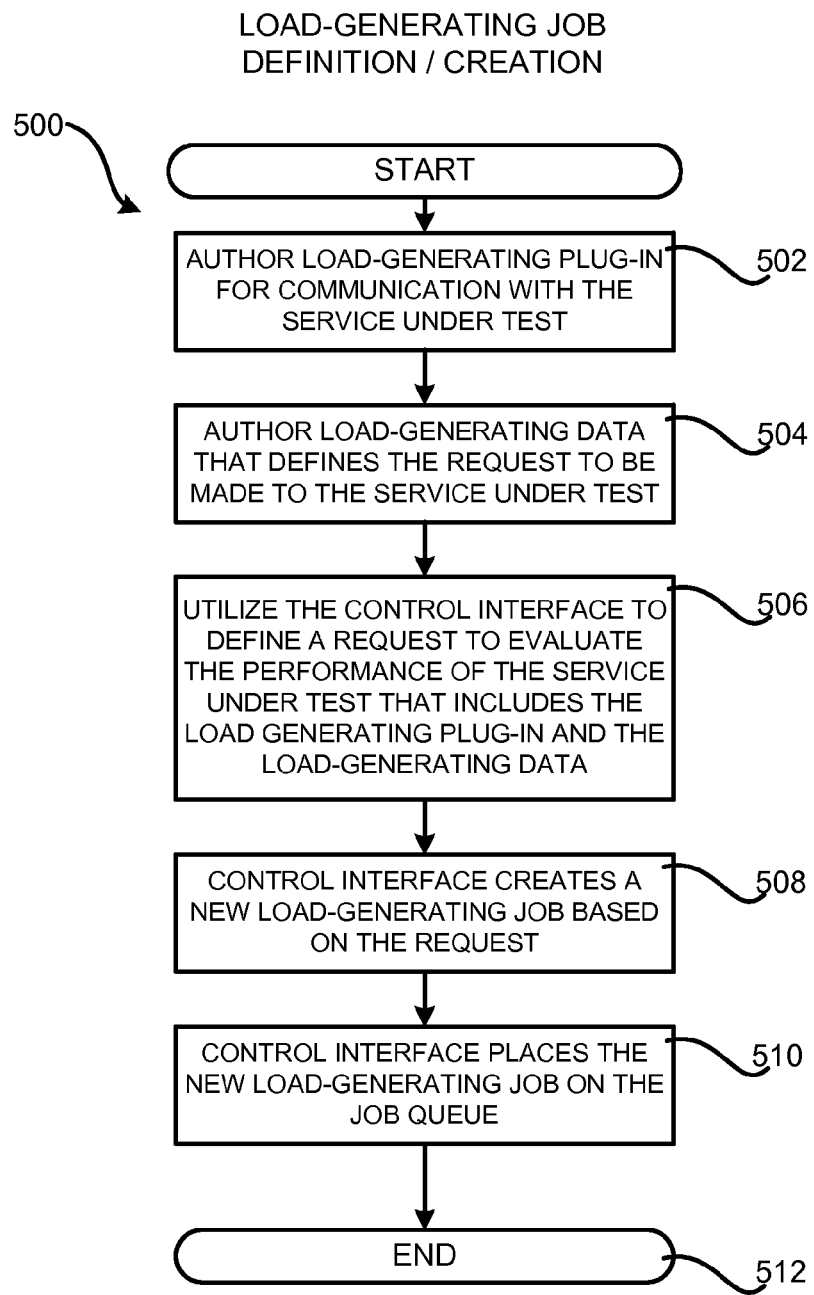
FIG. 5 is a flow diagram showing aspects of one illustrative routine for defining and creating a load-generating job utilized by a distributed performance evaluation framework, according to one embodiment disclosed herein.

FIG. 5 is a flow diagram showing aspects of one illustrative routine 500 for defining and creating a load-generating job 212 that may be utilized by the distributed performance evaluation framework in the manner described above, according to one embodiment disclosed herein. It should be appreciated that the logical operations described herein with respect to FIG. 5, and the other figures, may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 begins at operation 502, where a user authors a load-generating plug-in 212. As discussed above, the load-generating plug-in 304 is configured to communicate with a SUT 106 using an appropriate protocol. The load-generating plug-in 304 may be authored in virtually any declarative or scripted programming language. For example, in some embodiments, the load-generating plug-in 304 is authored using JAVA. The load-generating plug-in 304 might also be authored using other languages in other embodiments.

From operation 502, the routine 500 then proceeds to operation 504, where a user authors the load-generating data 306. As discussed above, the load-generating plug-in 304 utilizes the load-generating data 306 to create the requests 104 for submission to the SUT 106. From operation 504, the routine 500 proceeds to operation 506.

At operation 506, the control interface 112, described above, may be utilized to define a request 202 to evaluate the performance of the SUT 106. As described above with regard to FIG. 2, the request 202 might be defined through a UI or an API provided by the control interface 112. As also mentioned above, the request 202 might include data 204 identifying a network location of the location of a load-generating plug-in 304 or the load-generating plug-in 304 itself. The request 202 might also include the load-generating data 306, or data 206 identifying the location of the load-generating data 306. The request 202 might also specify a desired number of requests per time period 208 that the load-generating instances 108 are to submit to the SUT 106 and a condition, or conditions, under which the testing should be stopped.

From operation 506, the routine 500 proceeds to operation 508, where the control interface 112, or another component within the control and reporting tier 116, creates a load-generating job 212 based upon the received request 202. The routine 500 then continues to operation 510, where the control interface 112, or another component within the control and reporting tier 116, places the newly created load-generating job 212 on the job queue 302. The load-generating instances 108 may then dequeue the load-generating job 212 and process the job in the manner described herein. From operation 510, the routine 500 proceeds to operation 512, where it ends.

Figure 6A:
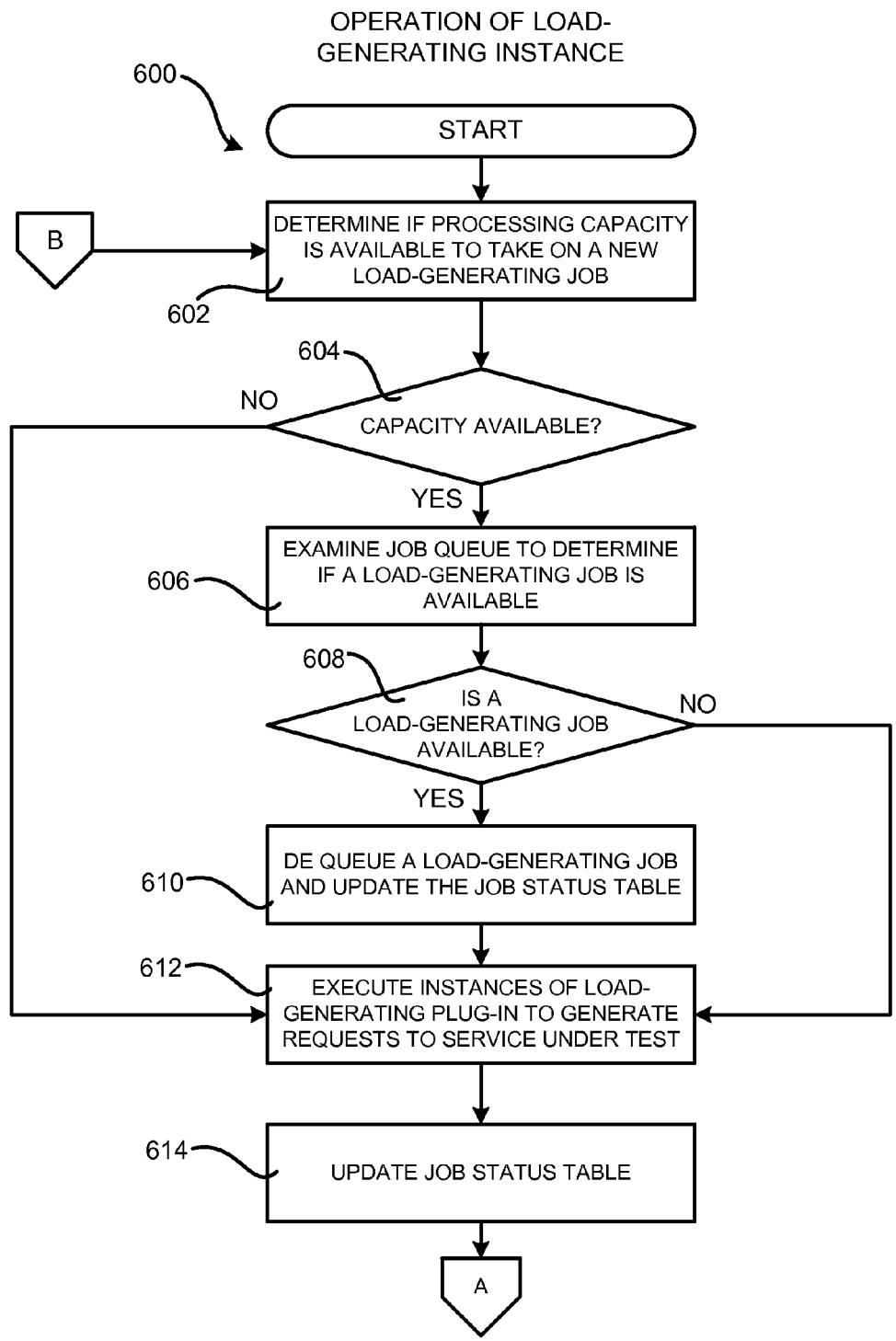
FIGS. 6A and 6B are flow diagrams that show a routine that illustrates aspects of the operation of a load-generating instance operating in conjunction with a distributed performance evaluation framework, according to one embodiment disclosed herein.
Figure 6B:
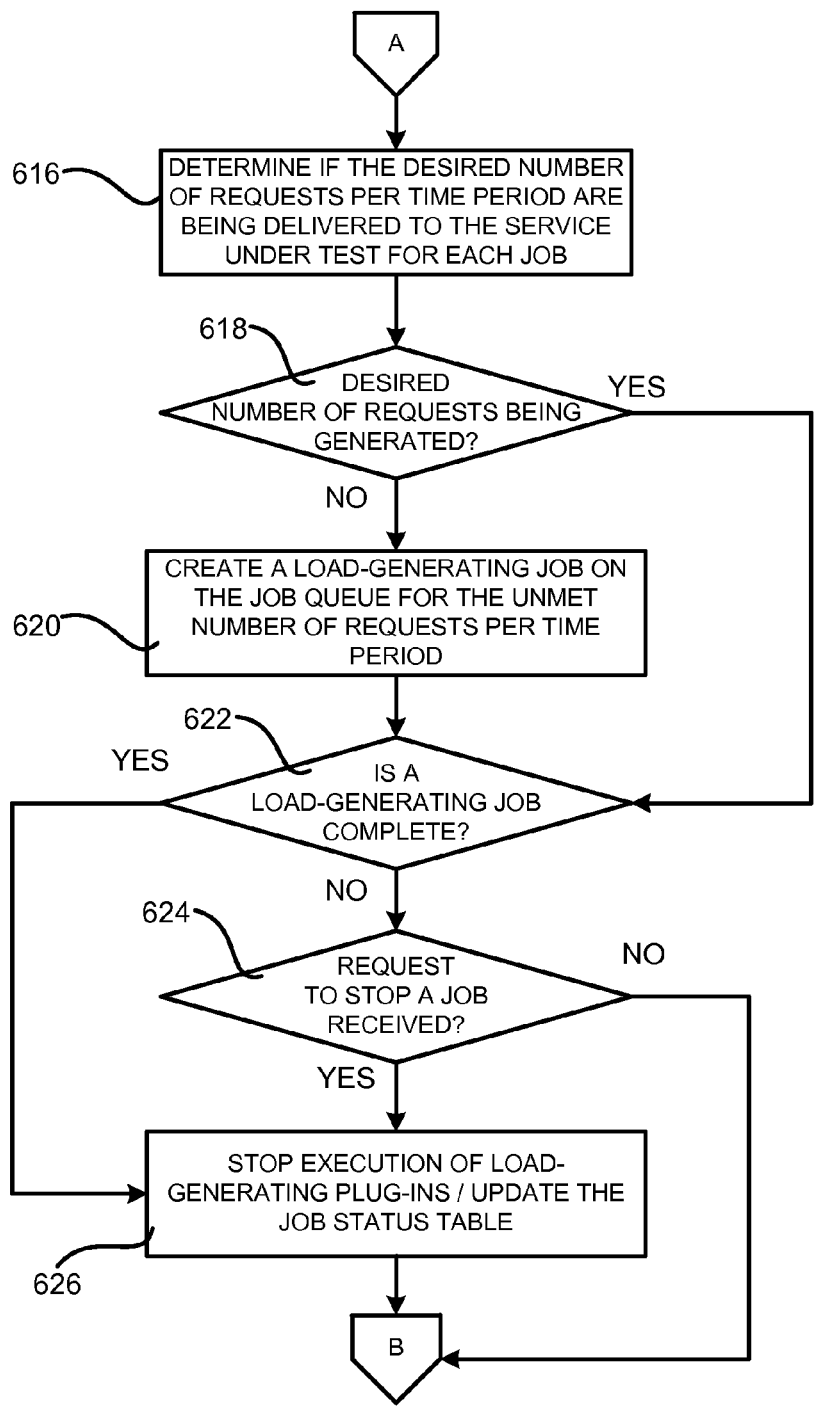

FIGS. 6A and 6B are flow diagrams showing a routine 600 that illustrates aspects of the execution of a load-generating instance 108, according to one embodiment disclosed herein. The routine 600 begins at operation 602, where a load-generating instance 108 determines if it has processing capacity available to start a new load-generating job 212. For example, the load-generating instance 108 might determine whether it has excess CPU or memory capacity to begin executing a new load-generating job. If the load-generating instance 108 determines that it has processing capacity available for a new job, the routine 600 proceeds from operation 604 to operation 606. If the load-generating instance 108 determines that it does not have available processing capacity, the routine 600 proceeds from operation 604 to operation 612, described below.

At operation 606, the load-generating instance 108 examines the job queue 302 to determine if a load-generating job 212 is available. If there are no load-generating jobs 212 on the job queue 302, the routine 600 proceeds from operation 608 to operation 612, described below. If there is at least one load-generating job 212 on the job queue 302, the routine 600 proceeds from operation 608 to operation 610.

At operation 610, the load-generating instance 108 dequeues a load-generating job 212 from the job queue 302. The load-generating instance 108 might also update an entry in the job status table 308 for the job. For example, the load-generating instance 108 might update an entry in the job status table 308 to indicate that the job has been taken off of the job queue 302. The routine 600 then proceeds from operation 610 to operation 612, where the load-generating instance 108 executes the load-generating plug-in 304 specified by the dequeued load-generating job 212 to generate the requests 104 to the SUT 106. As discussed above, the load-generating instance 108 might execute a number of load-generating threads 404 to execute the instances of the load-generating plug-in 304. The load-generating threads 404 may be executed separately from the reporting/monitoring threads 402.

From operation 612, the routine 600 proceeds to operation 614, where the load-generating instance 108 may update an entry in the job status table 308 for the job. For example, the load-generating instance 108 might update an entry in the job status table 308 to indicate the number of requests 104 that are being submitted to the SUT 106. As mentioned above, the load-generating instance 108 might execute one or more reporting/monitoring threads 402 to update the job status table 308. The reporting/monitoring threads 402 are executed separately from the load-generating threads 404 responsible for generating the requests 104 to the SUT 106 in one embodiment.

From operation 614, the routine 600 proceeds to operation 616, where the load-generating instance 108 determines if the desired number of requests 104 per time period are being delivered to the SUT 106. If the desired number of requests 104 per time period are being delivered to the SUT 106, the routine 600 proceeds from operation 618 to operation 622, described below. If the desired number of requests 104 per time period are not being delivered to the SUT 106, the routine 600 proceeds from operation 618 to operation 620.

At operation 620, the load-generating instance 108 creates a new load-generating job 212 on the job queue 302 for the unmet number of requests 104 per time period. As discussed above, the load-generating instance also reduces its own target number of requests per time period by the same amount. In this way, another load-generating instance 108 can dequeue the job and assist in providing the desired number of requests 104 per time period to the SUT. From operation 620, the routine 600 proceeds to operation 622.

At operation 622, the load-generating instance 108 determines whether a load-generating job 212 has been completed. For example, and as described above, a load-generating job 212 might be completed after a certain amount of time has elapsed, after a certain number of requests 104 have been delivered to the SUT 106, or after another condition, or conditions, have occurred. If a load-generating job 212 has completed, the routine 600 proceeds from operation 622 to operation 626, described below. If a load-generating job 212 has not completed, the routine 600 proceeds from operation 622 to operation 624.

At operation 624, the load-generating instance 108 determines if a control command 114 has been received indicating that a load-generating job 212 should be stopped. As mentioned above, the control interface 112 might receive control commands 114 by way of a UI or an API. The control commands 114 may then be provided to the load-generating tier 102. For example, the control interface 112 might update an entry in the job status table 308 indicating that a particular job should be stopped. If such a command has not been received, the routine 600 proceeds from operation 624 to operation 602, described above.

If a request to stop a load-generating job 212 has been received, the routine 600 proceeds from operation 624 to operation 626. At operation 626, the load-generating instance 108 stops the execution of the load-generating plug-ins 304. The load-generating instance 108 might also update the job status table 308 to indicate that that the job is stopping and, ultimately, that the job has been stopped. From operation 626, the routine 600 proceeds back to operation 602, where the processing described above may be repeated.

Figure 7A:
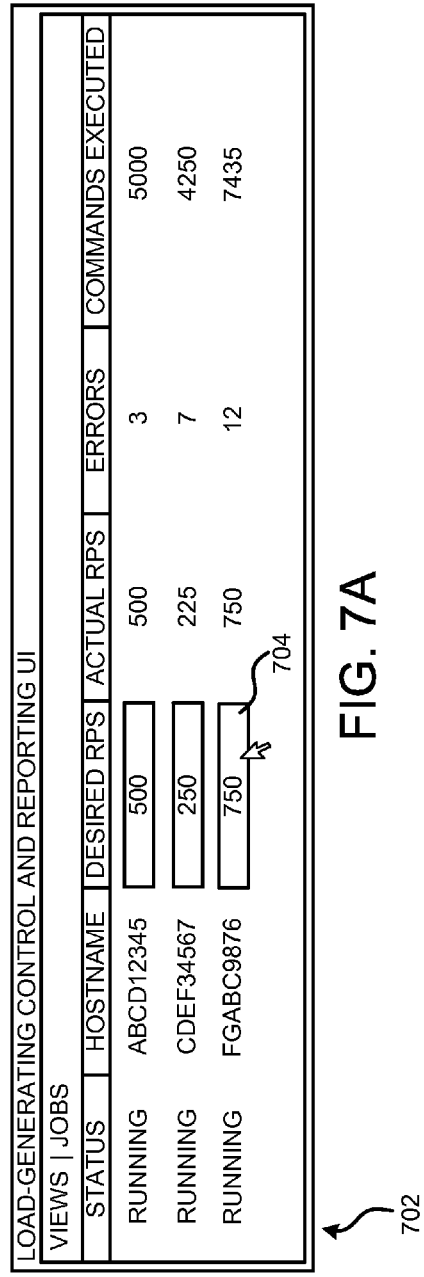
FIGS. 7A and 7B are user interface diagrams showing aspects of illustrative user interfaces for viewing the status of one or more load-generating jobs and for creating a new load-generating job, respectively.
Figure 7B:
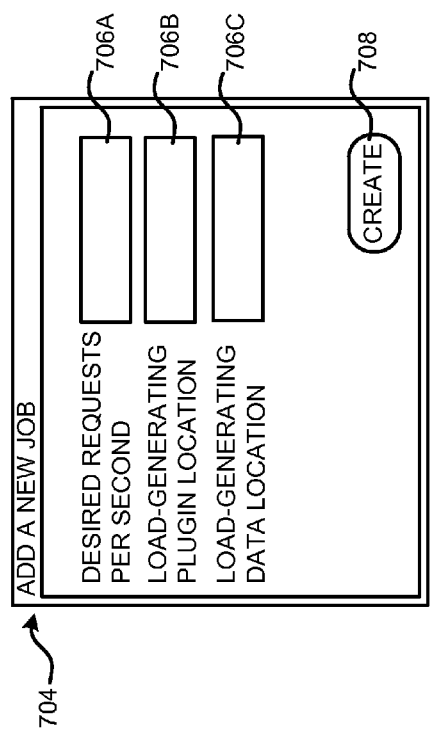

FIGS. 7A and 7B are user interface diagrams showing aspects of illustrative user interfaces 702 and 704 for viewing the status of one or more load-generating jobs 212 and for creating a new load-generating job 212, respectively. As mentioned briefly above, the control and reporting tier 110 might provide a UI for viewing information regarding the status of load-generating jobs. FIG. 7A shows one example UI 702 for providing this functionality. Additionally, and as also described briefly above, the control and reporting tier 110 might also provide a UI for submitting a request 202 to evaluate the performance of an SUT 106. FIG. 7B shows one example UI 704 for providing this functionality.

The UI 702 shown in FIG. 7A includes a number of rows, each of which corresponds to a load-processing job 212. The UI 702 also includes a number of columns corresponding to job status information for each of the load-processing jobs 212. For instance, in the illustrative UI 702 shown in FIG. 7A, columns have been provided for displaying the status of each load-processing job 212, the name of the host (i.e. load-processing instance 108) upon which each job is executing, the desired number of requests 104 per time period (e.g. requests per second), the actual number of requests 104 per time period that are being provided to the SUT 106, the number of errors encountered, and the number of commands that have been executed. It should be appreciated that the content shown in the illustrated columns is merely illustrative and that other columns providing other types of information might also be presented. Additionally, in other embodiments, functionality may be provided for allowing a user to customize the columns that are displayed in the UI 702.

The UI 702 shown in FIG. 7A might also provide functionality for modifying a load-producing job 212. For instance, a user might be permitted to select and modify the desired requests per time period for each load-generating job reflected in the UI 702. In the example shown in FIG. 7A, for instance, a mouse cursor has been utilized to select the field 704. The value shown in the field 704 may then be modified. The modified value may then be propagated to the job queue 302 for consumption by the load-generating instances 108. The UI 702 might also be configured to allow a user to change other aspects of a load-generating job 212.

The UI 704 shown in FIG. 7B allows a user to create a new load-generating job 212. The UI 704 might be presented by the control interface 112 in response to receiving a request to create a new load-generating job 212 in one embodiment. The UI 704 includes a number of fields 706A-706C, respectively, that allow a user to specify the desired number of requests 104 per time period, the location of a load-generating plug-in 304, and the location of the load-generating data 306. The UI 704 might also provide fields (not shown in FIG. 7B) for allowing a user to specify the conditions under which a job should be stopped, the number of load-generating threads 404 that may be utilized by the job, and potentially other types of data. Once the user has provided values for the fields 706A-706C, the user may select the UI button 708. In response to such a selection, a new load-processing job 212 will be created and processed in the manner described above. It should be appreciated that the UIs 702 and 704 shown in FIGS. 7A and 7B are merely illustrative and that many different arrangements of UI controls may be utilized to provide the functionality disclosed herein.

Figure 8:
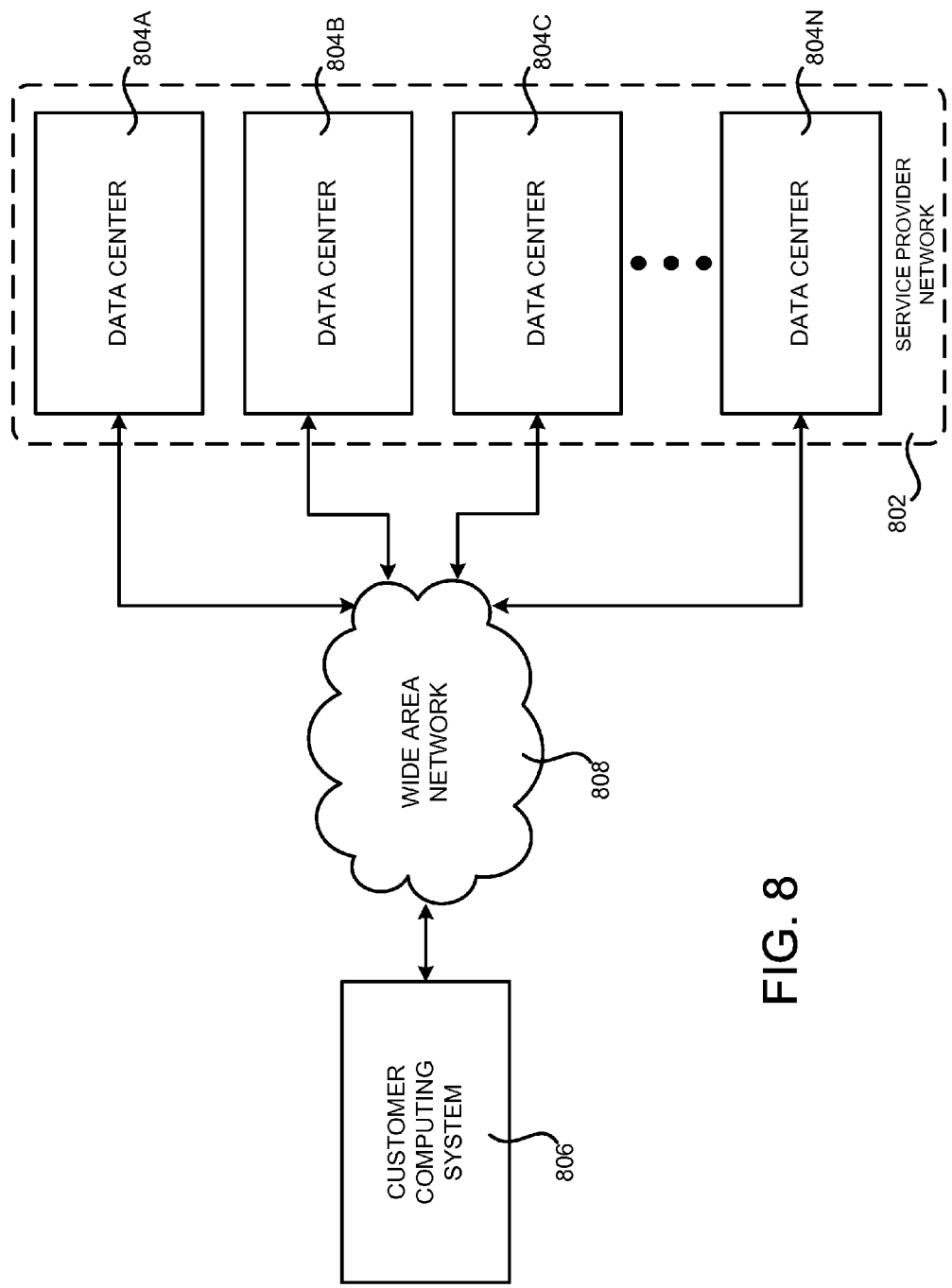
FIG. 8 is a system and network diagram that shows one illustrative operating environment for the embodiments disclosed herein that includes a service provider network that provides functionality for implementing aspects of a distributed performance evaluation framework, according to one embodiment disclosed herein.

FIG. 8 is a system and network diagram that shows one illustrative operating environment for the embodiments disclosed herein that includes a service provider network 802 that may be configured to implement virtual machine instances for implementing the control and reporting tier 110, the load-generating tier 102, and/or the SUT 106. As discussed briefly above, the service provider network 102 can provide computing resources on a permanent or an as-needed basis. The computing resources provided by the service provider network 102 may include various types of computing resources, such as data processing resources, data storage resources, networking resources, data communication resources, and the like.

Each type of computing resource provided by the service provider network 802 may be general-purpose or may be available in a number of specific configurations. For example, data processing resources may be available as virtual machine instances in a number of different configurations. The virtual machine instances may be configured to execute applications, including Web servers, application servers, media servers, database servers, and other types of applications, such as those described above. Data storage resources may include file storage devices, block storage devices, and the like. The service provider network 802 might also provide other types of services, such as a distributed queue service for implementing the job queue 302 or database services for implementing a database for providing the job status table 308. A service provider might also offer other types of resources for purchase and use by customers.

The computing resources provided by the service provider network 802 are enabled in one implementation by one or more data centers 804A-804N (which may be referred herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 might also be located in geographically disparate locations. One illustrative configuration for a data center 804 that implements aspects of functionality disclosed herein for providing a distributed performance evaluation framework will be described below with regard to FIG. 9.

The customers and other users of the service provider network 802 may access the computing resources provided by the service provider network 802 over a WAN 808. For example, a user of the distributed performance evaluation framework disclosed herein might utilize a Web browser application executing on the customer computing system 806 to submit requests to evaluate the performance of a SUT 106 to the control interface 112. Similarly, a user of the distributed performance evaluation framework disclosed herein might utilize a Web browser application executing on the customer computing system 806 obtain the status information 118 describing the status of the load-generating jobs 212 executing on the load-generating instances 108. Although a WAN 808 is illustrated in FIG. 8, it should be appreciated that a local-area network ("LAN"), the Internet, or any other networking topology known in the art that connects the data centers 804 to remote customers and other users may be utilized. It should also be appreciated that combinations of such networks might also be utilized.

The service provider operating the service provider network 802 might also charge a fee for the use of computing resources to a customer that creates and uses the resources. The fee charged for a particular resource might be based upon the type and/or configuration of the resource. The fee charged for a particular resource might also be based upon the amount of time the resource is utilized. For example, in the case of a data processing resource, like a virtual machine instance, the fee for use of the resource might be charged based upon the amount of time the resource is utilized. In the case of a data storage resource, the fee might be computed based upon the amount of data stored and/or the amount of data transferred into or out of the resource. The fees for other types of resources might also be based upon other considerations. A service provider might also utilize various purchasing models to determine the amount to charge a customer for use of resources provided by the service provider. In some embodiments, the functionality disclosed herein for evaluating the performance of an SUT 106 is provided for free. A charge might be incurred, however, for the use of the virtual machine instances that implement the load-generating instances 108. A charge might also be made for the use of the resources that implement the job status table 308 and the job queue 302.

The various resources described above might also be provisioned and de-provisioned as needed in an automated fashion. For example, a new virtual machine instance might be provisioned in response to determining that a load-generating instance 108 is not capable of providing a desired number of requests 104 to a SUT 106. In this case, a provisioning component (not shown in FIG. 8), or one or more other components within the service provider network 802, might create the new instance of the virtual machine in the service provider network 802. The new virtual machine instance may then be utilized to implement a load-generating instance 108 in the manner described above. In a similar fashion, virtual machine instances might be de-provisioned after the testing of a SUT 106 has been completed. In this way, a customer utilizing the framework described herein to evaluate the performance of a SUT 106 is charged only for the resources actually utilized during testing. It should be appreciated that computing resources other than virtual machine instances utilized to evaluate the performance of a SUT 106 might be provisioned and de-provisioned in a similar fashion.

Figure 9:
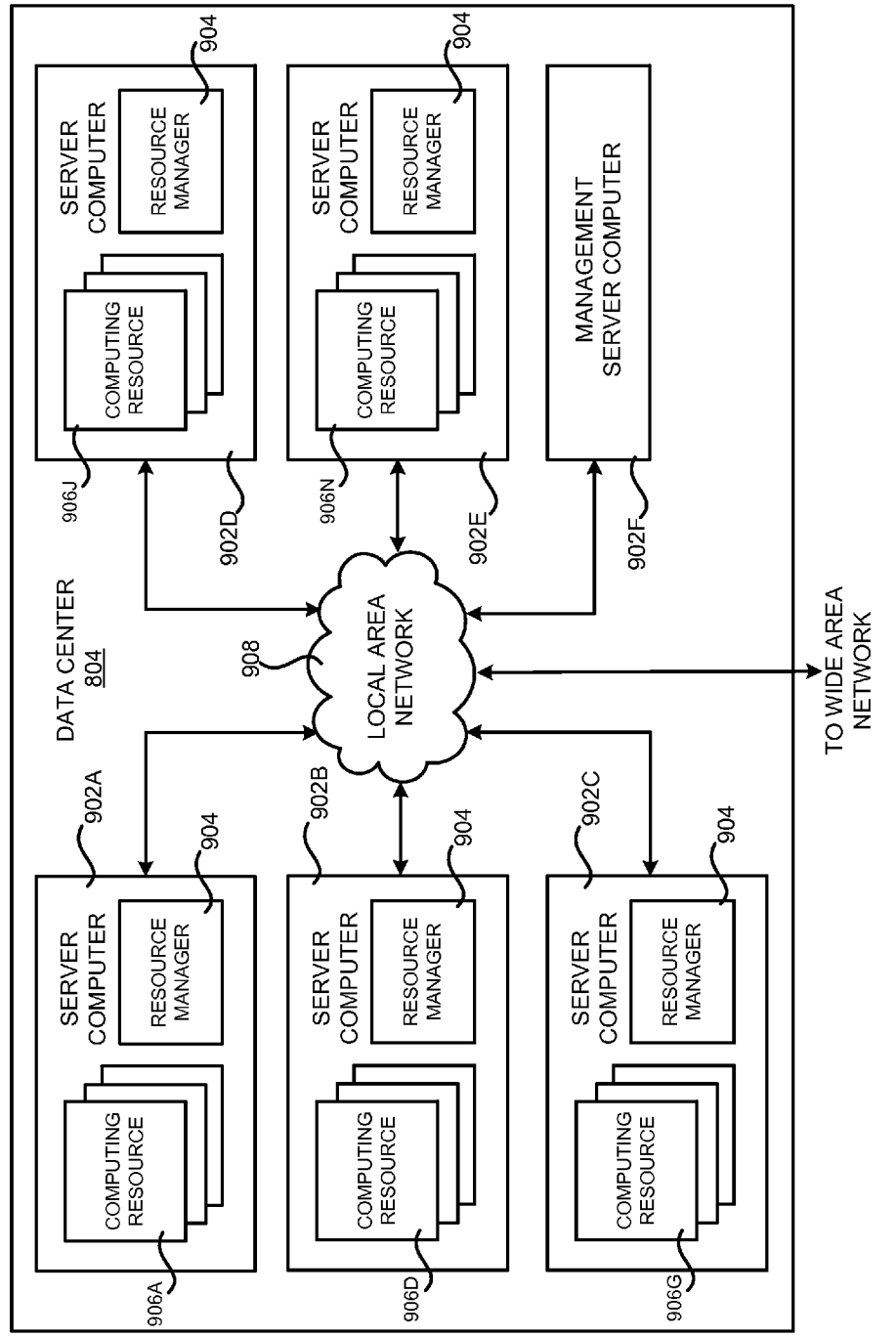
FIG. 9 is a computing system diagram that illustrates one configuration for a data center that may be utilized to implement aspects of the distributed performance evaluation framework disclosed herein, according to one embodiment disclosed herein.

FIG. 9 is a computing system diagram that illustrates one configuration for a data center 804 that may be utilized to implement aspects of distributed performance evaluation framework described above, according to one embodiment disclosed herein. The example data center 804 shown in FIG. 9 includes several server computers 902A-902F (which may be referred herein singularly as "a server computer 902" or in the plural as "the server computers 902") for providing the computing resources described above, such as virtual machine instances.

The server computers 902 may be standard tower or rack-mount server computers configured appropriately for providing the computing resources described herein. For example, in one implementation the server computers 902 are configured to provide computing resources such as data processing resources, data storage resources, database resources, networking resources, and potentially others. Some of the servers 902 might also be configured to execute a resource manager 904 capable of instantiating and/or managing the resources. In the case of virtual machine instances, for example, the resource manager 904 might be a hypervisor or another type of program configured to enable the execution of multiple virtual machine instances on a single server computer 902. The data center 804 shown in FIG. 9 might also include at least one management server computer 902F that is reserved for executing various software components for managing the operation of the data center 804, the server computers 902, and the computing resources described above. Other configurations might also be utilized.

In the example data center 804 shown in FIG. 9, an appropriate LAN 908 is utilized to interconnect the server computers 902A-902F. The LAN 908 is also connected to the WAN 808 illustrated in FIG. 8. It should be appreciated that the configuration and network topology illustrated in FIGS. 1-9 has been greatly simplified and that many more computing systems, networks, and networking devices may be utilized to interconnect the various computing systems disclosed herein and to provide the functionality described above. Appropriate load balancing devices or software modules might also be utilized for balancing a load between each of the data centers 804A-804N, between each of the server computers 902A-902F in each data center 804, and, potentially, between computing resources in each of the data centers 804. It should be appreciated that the data center 804 described with respect to FIG. 9 is merely illustrative and that other implementations might be utilized.

Figure 10:
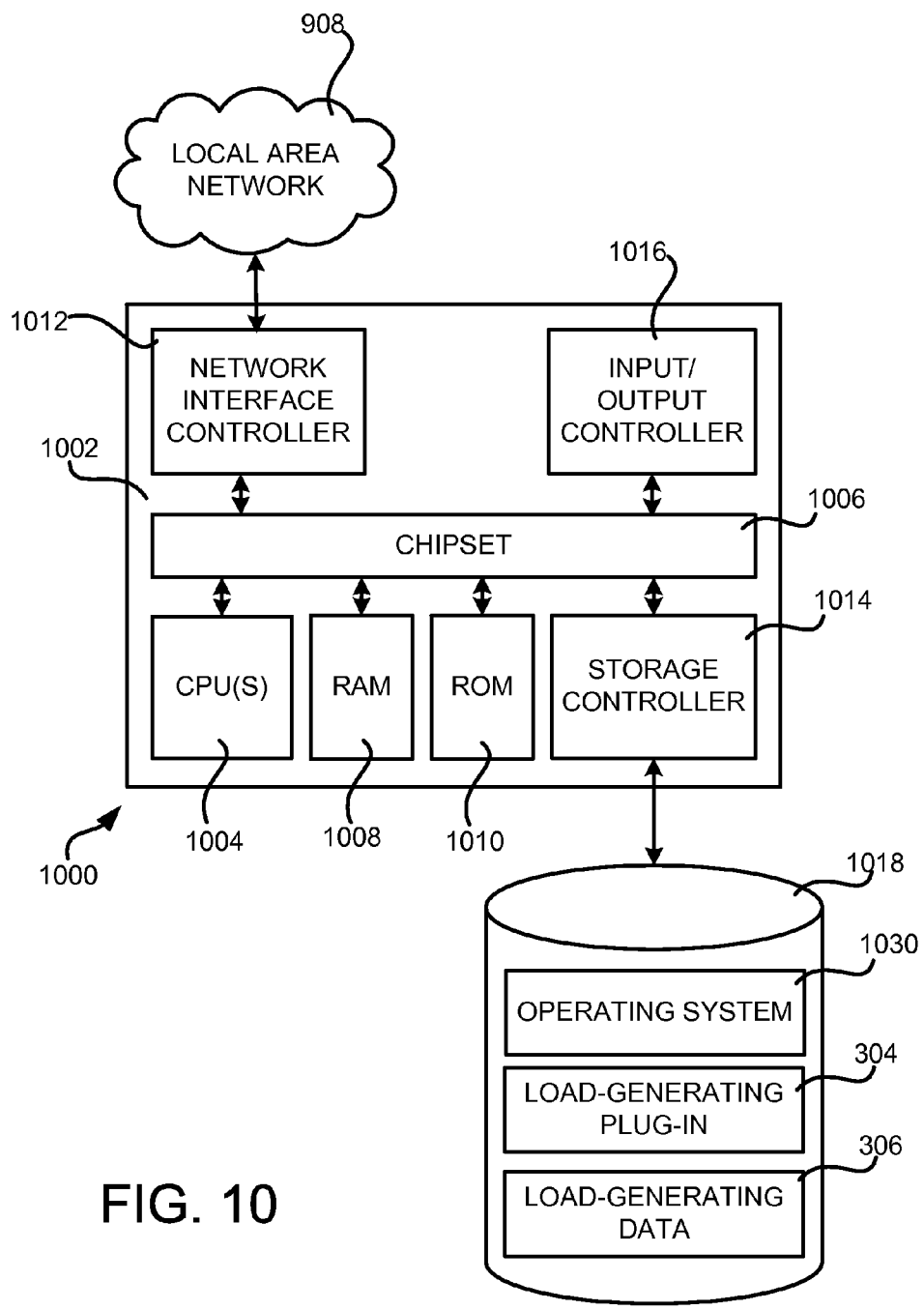
FIG. 10 is a computer architecture diagram showing an illustrative computer hardware architecture for implementing a computing device that might be utilized to implement aspects of the various embodiments presented herein.

FIG. 10 shows an illustrative computer architecture for a computer 1000 capable of executing the program components described above for providing a distributed performance evaluation framework. The computer architecture shown in FIG. 10 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 10 may be utilized to execute the load-generating plug-in 304. The computer-architecture shown in FIG. 10 might also be utilized to execute other software components in the control and reporting tier 110, the load-generating tier 102, and, potentially, to provide the SUT 106.

The computer 1000 includes a baseboard 1002, or "motherboard," which is a printed circuit board to which a multitude of components or devices may be connected by way of a system bus or other electrical communication paths. In one illustrative embodiment, one or more central processing units ("CPUs") 1004 operate in conjunction with a chipset 1006. The CPUs 1004 may be standard programmable processors that perform arithmetic and logical operations necessary for the operation of the computer 1000. The CPUs 1004 may be configured with one or more processing cores.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a random access memory ("RAM") 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the embodiments described herein.

The computer 1000 may operate in a networked environment using logical connections to remote computing devices and computer systems through a network, such as the local area network 908. The chipset 1006 may include functionality for providing network connectivity through a NIC 1012, such as a gigabit Ethernet adapter. The NIC 1012 is capable of connecting the computer 1000 to other computing devices over the network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules, and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage, and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1000.

By way of example, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1018 may store other system or application programs and data utilized by the computer 1000, such as the load-generating plug-in 304, the load-generating data 306, and/or any of the other software components and data described above. The mass storage device 1018 might also store other programs and data not specifically identified herein.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various routines described above with regard to FIGS. 5-6B. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for providing a distributed performance evaluation framework have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system for evaluating performance of a service, the system comprising:
   one or more computing systems configured to provide a control and reporting tier configured to receive a request by way of a load generating Web service application programming interface (API) to evaluate the performance of the service and, in response to receiving the request, to generate a load-generating job based upon the request and to provide the load-generating job to a load-generating tier; and
   one or more other computing systems configured to provide the load-generating tier, the load-generating tier comprising one or more load-generating instances configured to receive the load-generating job and to generate requests to the service based upon the load-generating job, wherein each of the load-generating instances is further configured to determine if at least a desired number of requests per time period are being submitted to the service and, if at least the desired number of requests per time period are not being submitted to the service, to enable other of the load-generating instances to also submit requests to the service.

2. The system of claim 1, wherein the request to evaluate the performance of the service comprises data identifying a load-generating plug-in executable by the load-generating instances and configured to communicate with the service.

3. The system of claim 2, wherein the request to evaluate the performance of the service further comprises load-generating data, and wherein the load-generating plug-in is configured to utilize the load-generating data to generate the requests to the service.

4. The system of claim 3, wherein the request to evaluate the performance of the service further comprises data identifying the desired number of requests per time period to be submitted to the service.

5. A system for evaluating performance of a service, the system comprising:
   one or more computing systems configured to provide a control and reporting tier configured to receive a request by way of a load generating Web service application programming interface (API) to evaluate the performance of the service and, wherein the request to evaluate the performance of the service further specifies a desired amount of stress that should be applied to the service, in response to receiving the request, to generate a load-generating job based upon the request and to provide the load-generating job to a load-generating tier;
   one or more other computing systems configured to provide the load-generating tier, the load-generating tier comprising one or more load-generating instances configured to receive the load-generating job and to generate requests to the service based upon the load-generating job, wherein each of the load-generating instances is further configured to determine if at least a desired number of requests per time period are being submitted to the service and, if at least the desired number of requests per time period are not being submitted to the service, to enable other of the load-generating instances to also submit requests to the service.

6. The system of claim 5, wherein the control and reporting tier is further configured to receive data from the load-generating tier defining a status of the load-generating job and to provide an interface for accessing the data defining the status of the load-generating job.

7. A computer-implemented method, comprising:
   providing a load generating Web service application programming interface (API) for receiving a request to evaluate performance of a service, the request being expressed independently of a load-generating tier utilized to generate a load for evaluating the performance of the service, wherein the request to evaluate the performance of the service further comprises data identifying a condition under which execution of the load-generating job should be stopped;
   generating a load-generating job in response to receiving the request;
   providing the load-generating job to a load-generating tier configured to utilize the load-generating job to generate requests to the service as defined by the load-generating job;
   identifying the condition under which execution of the load-generating job should be stopped; and
   stopping execution of the load-generating job.

8. The computer-implemented method of claim 7, further comprising:
   receiving data from the load-generating tier defining a status of the load-generating job; and
   providing an interface for accessing the data defining the status of the load-generating job.

9. The computer-implemented method of claim 8, wherein the request to evaluate the performance of the service comprises data identifying a load-generating plug-in configured to communicate with the service and which is executable by load-generating instances in the load-generating tier.

10. The computer-implemented method of claim 9, wherein the request to evaluate the performance of the service further comprises load-generating data that is utilized by the load-generating plug-in to generate the requests to the service.

11. The computer-implemented method of claim 10, wherein the request to evaluate the performance of the service further comprises data identifying a desired number of requests per time period to be submitted to the service.

12. The computer-implemented method of claim 8, further comprising providing a user interface for receiving a request to evaluate performance of the service.

13. The computer-implemented method of claim 8, wherein the interface for accessing the data defining the status of the load-generating job comprises a user interface.

14. The computer-implemented method of claim 8, wherein the interface for accessing the data defining the status of the load-generating job comprises an application programming interface.

15. A computer-implemented method, comprising:
   determining if processing capacity is available to a load-generating instance to perform a load-generating job requested by way of a load generating Web service application programming interface (API);

in response to determining that capacity is available to perform a load-generating job, obtaining the load-generating job;

in response to obtaining the load-generating job, identifying a load-generating plug-in and load-generating data associated with the load-generating job;

using the identified load-generating plug-in and load-generating data to generate requests to a service under test;

determining if at least a desired number of requests per time period are being submitted to the service under test; and if at least the desired number of requests per time period are not being submitted to the service, enabling one or more other load-generating instances to also submit requests to the service under test.

16. The computer-implemented method of claim 15, wherein enabling one or more other load-generating instances to also submit requests to the service under test comprises placing a load-generating job on a job queue corresponding to the desired number of requests per time period that are not being submitted to the service.

17. The computer-implemented method of claim 15, further comprising:
   determining if the load-generating job is complete; and
   in response to determining that the load-generating job is complete, stopping the execution of the instances of the load-generating plug-in.

18. The computer-implemented method of claim 15, further comprising periodically updating a job status table with data describing a status of the load-generating job.

19. The computer-implemented method of claim 15, wherein the load-generating instances comprise virtual machine instances provided by a service provider network.

20. The computer-implemented method of claim 15, wherein using the identified load-generating plug-in and load-generating data to generate requests to a service under test comprises causing one or more instances of the load-generating plug-in to be executed on the load-generating instance, whereby the instances of the load-generating plug-in utilize the load-generating data to generate requests to a service under test.

* * * * *